248. SUPPORTS.
276

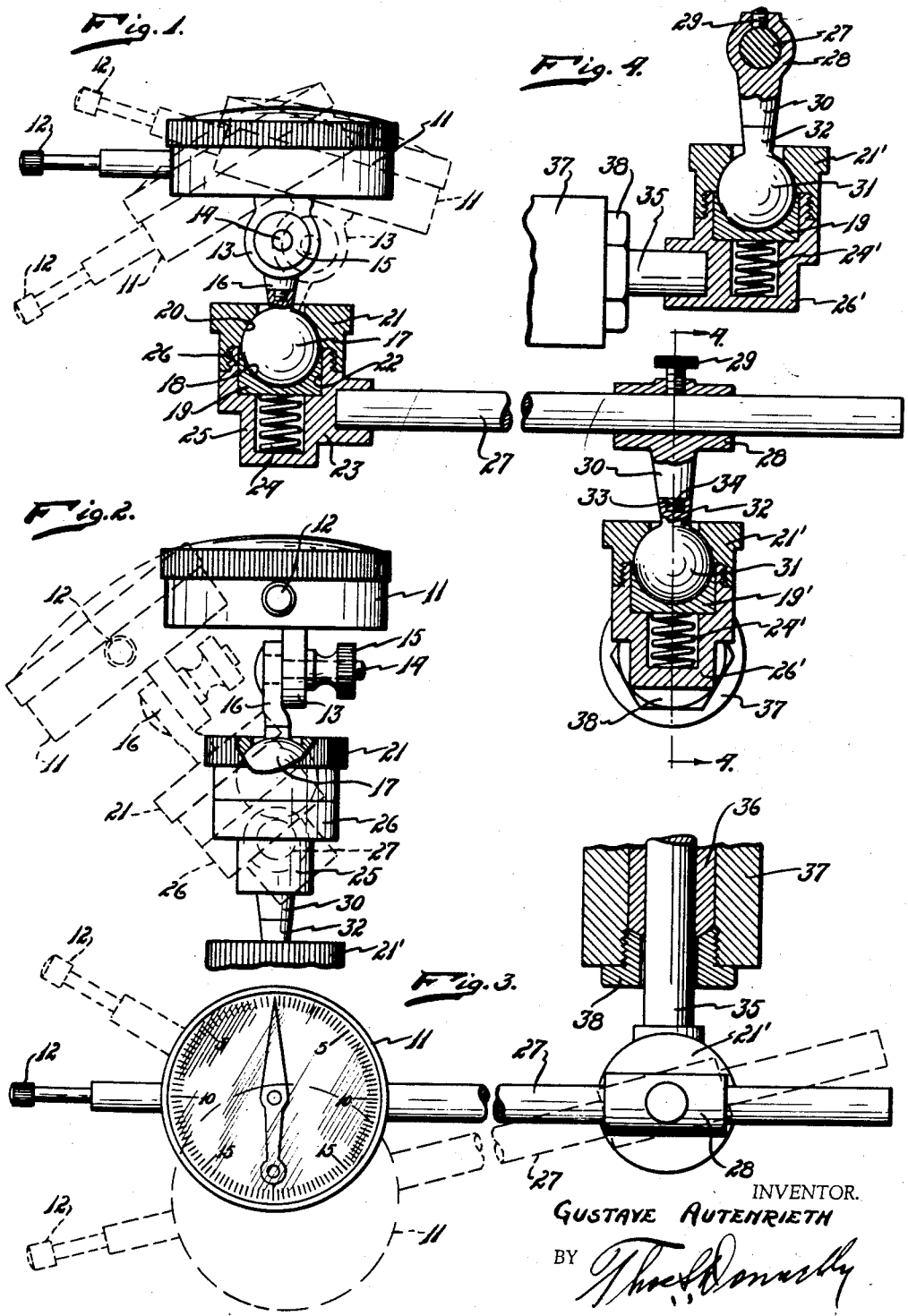

Patented Mar. 9, 1937

2,073,089

UNITED STATES PATENT OFFICE 2,073,089

GAUGE MOUNTING

Gustave Autenrieth, Detroit, Mich.

Application March 22, 1935, Serial No. 12,353

2 Claims. (Cl. 248—276)

My invention relates to a new and useful improvement in a gauge mounting adapted for use in mounting a gauge or indicating device on a lathe, milling machine, or similar structure. The mounting is intended for use with gauges and indicators used for indicating external dimensions or diameters. It is an object of the present invention to provide a mounting which will give a maximum degree of flexibility so that a universal movement of the gauge or indicator may be accomplished.

It is another object of the invention to provide a mounting so arranged and constructed that the gauge or indicator will be used in all positions or locations in which it is necessary that the same be used so that no removal and replacement of the gauge is necessary.

Another object of the invention is the provision of a mounting of this class which will be simple in structure, economical of manufacture, durable, and highly efficient in use.

Other objects will appear hereinafter.

The invention consists in the combination and arrangement of parts hereinafter described and claimed.

The invention will be best understood from a reference to the accompanying drawing which forms a part of this specification and in which, Fig. 1 is a side elevational view of the mounting with parts shown in section.

Fig. 2 is a front elevational view of the mounting with parts broken away.

Fig. 3 is a top plan view of a slightly modified form of the invention with parts shown in section.

Fig. 4 is taken on line 4—4 of Fig. 1.

In Fig. 1, I have shown the indicator 11 with a contact point 12 projecting outwardly therefrom. Extending down from the base of the indicator 11 is a boss 13 through which extends the bolt 14 on which is threaded the nut 15 whereby the indicator may be mounted on the boss 16 and swung to various positions as shown in dotted lines in Fig. 1 on the bolt 14 as a pivot. This boss or standard 16 projects upwardly from the ball 17 which rests in a socket formed from the recess 18 in the block 19 and the recess 20 in the cap 21. This block 19 is positioned in the cavity formed in the head 23 and cap 21 is threaded thereon. Spring 24 positioned in the extension 25 of the head serves to force the block 19 upwardly so as to maintain a close bearing on the ball 17 and prevent any undue movement of the same. The structure is such, however, that the plate or standard 16 may be rocked to various positions s shown in dotted lines in Fig. 1 and in Fig. 2. Thus a universal movement is effected through this connection.

The head 26 is mounted on one end of the rod 27. This rod passes through a supporting sleeve 28 and may be slid longitudinally therein. The set screw 29 serves to lock the sleeve 28 in various positions on the rod 27. Projecting downwardly from the sleeve 28 is a supporting standard 30 connected to which is a bolt 31, the bolt 31 is provided with the neck 32 having the threaded socket 33 for the reception of the threaded neck 34. This bolt 31 is engaged by a block 19'' positioned in a head 26'' and forced by the spring 24' upwardly toward the retaining cap 21'. In this regard the structure is the same as the support connected to the end of the rod 27. The rod 27 may be tilted and universally moved on this mounting as will be obvious and the head 26' may be attached to a milling machine, or lathe tool post in desired manner. In Fig. 3 the head 26' is illustrated as being connected to the rod 35 which projects through the clamping sleeve 36 mounted on the collet 37 and movable into rockable position by the jam nut 38.

It is believed obvious that with a mounting such as I have described universal movement of the gauge becomes possible and considerable economy in operation is effected by virtue of the fact that the same does not have to be dismounted and remounted for various types of jobs.

The invention, including all of the parts connecting the gauge 11 with the rod 27, may be used as standard equipment on all service plates as the standard sliding blocks are all equipped with an upstanding rod having a sleeve for the reception of the rod 27. It is also believed obvious that the mounting may be used for other purposes than merely mounting a gauge as the construction may be used wherever a universal movement of this kind is desired.

While I have illustrated and described the preferred form of my invention I do not wish to limit myself to the precise details of structure shown, but desire to avail myself of such variations and modifications as come within the scope of the appended claims.

Having thus described my invention what I claim as new and desire to secure by Letters Patent is:

1. In combination with an instrument casing, a head; a rod connected at one end to said head and projecting outwardly therefrom; a pressure block slidably mounted in said head and having a semi-spherical recess in its upper face; a cap threaded on said head and having its inner surface recessed, and forming, with the recess in said block, a spherical chamber; a ball positioned in said chamber; a standard secured to and projecting outwardly from said ball through an opening formed in said cap; a lug on the casing; means for pivotally connecting said lug to the outer end of said standard; means in said head for pressing said block against said ball and preventing undue movement of the same; and means for mounting said rod intermediate its ends for universal movement.

2. In combination with an instrument casing, a cup-shaped head; a neck projecting outwardly from one side of said head; a rod engaging at one end in said neck and serving as a support for said head; a pressure block slidably mounted in said head and having a semi-spherical recess in its upper face; a spring positioned beneath said pressure block and the bottom of said head for normally forcing said pressure block upwardly, said head being recessed at its bottom to a point below the center of said rod for accommodating said spring; a cap threaded on said head and having its inner surface recessed and forming, with the recess in said block, a spherical chamber; a standard secured to and projecting outwardly from said ball through an opening formed in said cap; a lug on the casing; and means for pivotally connecting said lug to the outer end of said standard, the pressure of said spring normally resisting movement of said ball in said chamber.

GUSTAVE AUTENRIETH.